J. A. McVICKAR.
VEHICLE SIGNAL.
APPLICATION FILED JAN. 15, 1908.
935,855.
Patented Oct. 5, 1909.
4 SHEETS—SHEET 1.
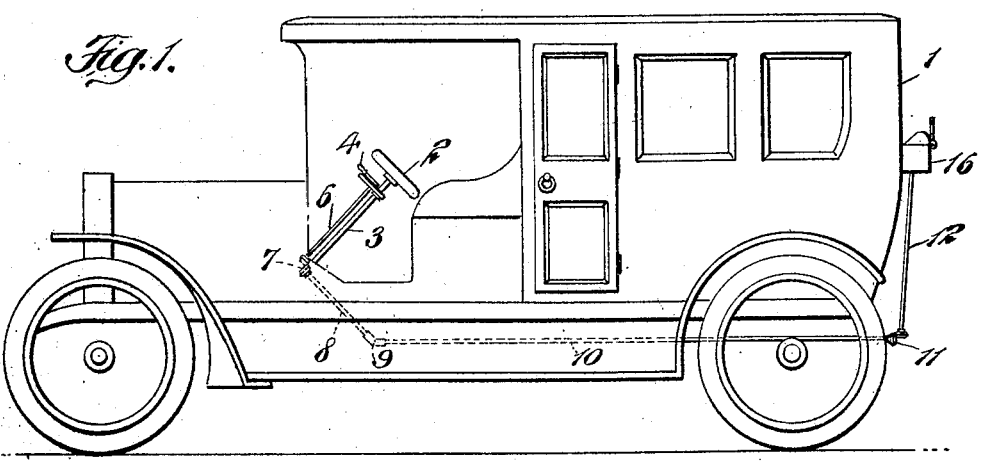
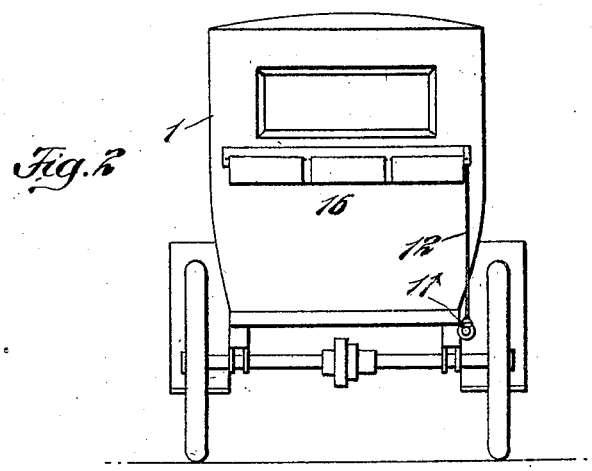

J. A. McVICKAR.
VEHICLE SIGNAL.
APPLICATION FILED JAN. 15, 1908.
935,855.
Patented Oct. 5, 1909.
4 SHEETS—SHEET 2.
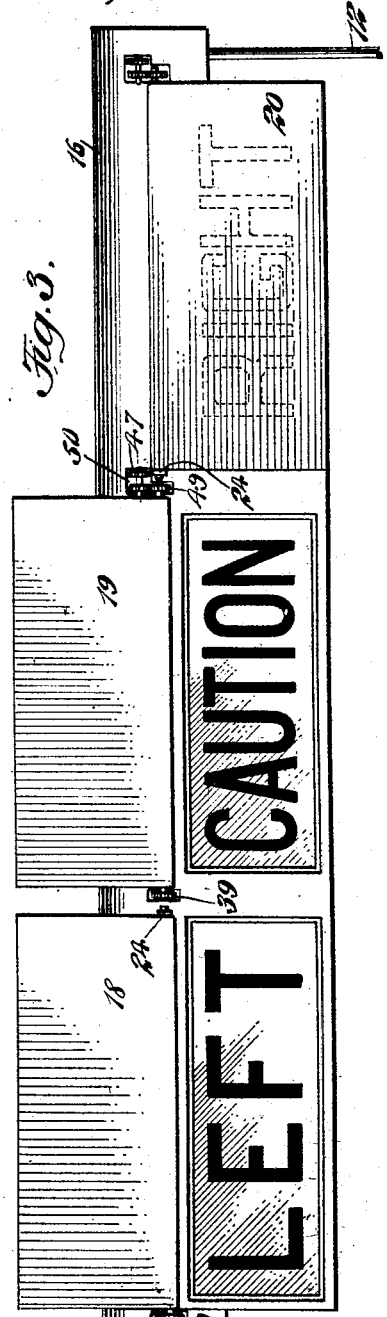
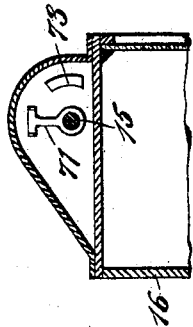
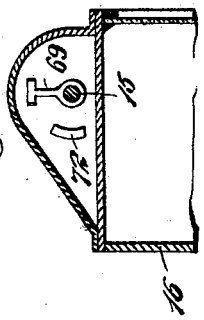
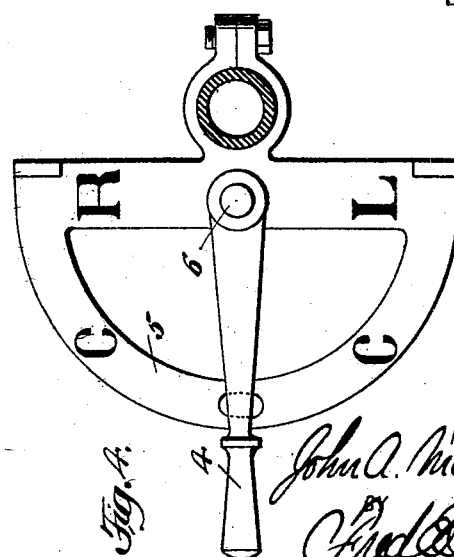
WITNESSES
INVENTOR
John A. McVickar
ATTORNEY

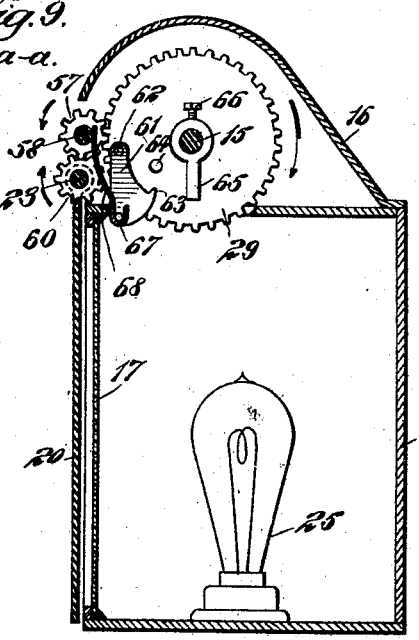
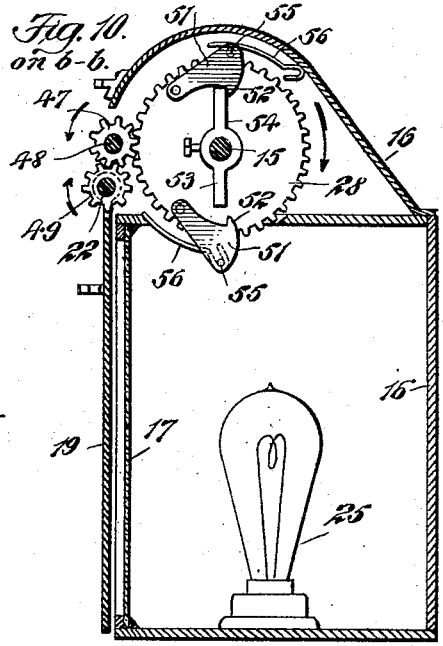
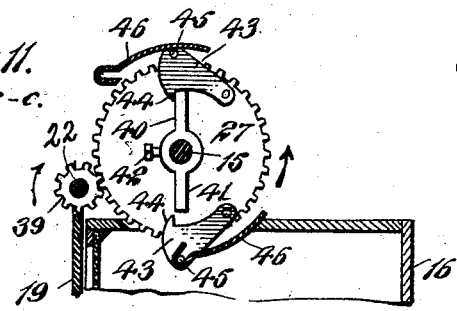
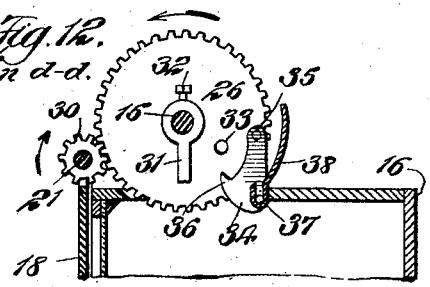
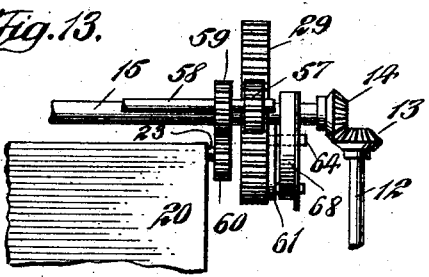
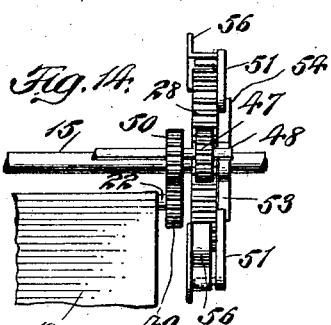

J. A. McVICKAR.
VEHICLE SIGNAL.
APPLICATION FILED JAN. 15, 1908.
935,855.
Patented Oct. 5, 1909.
4 SHEETS—SHEET 4.
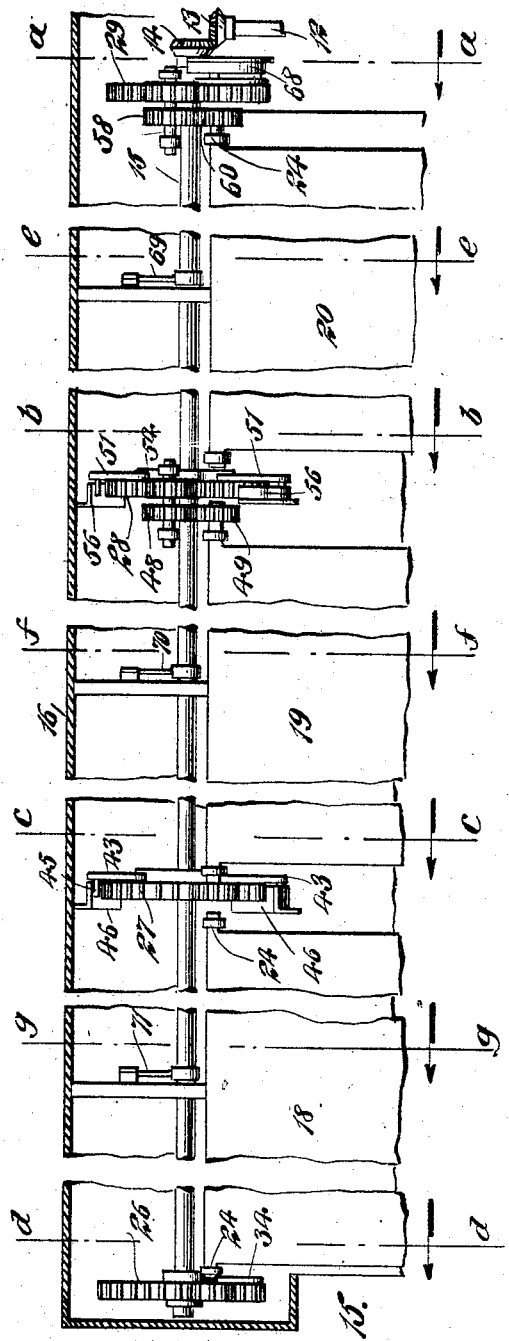
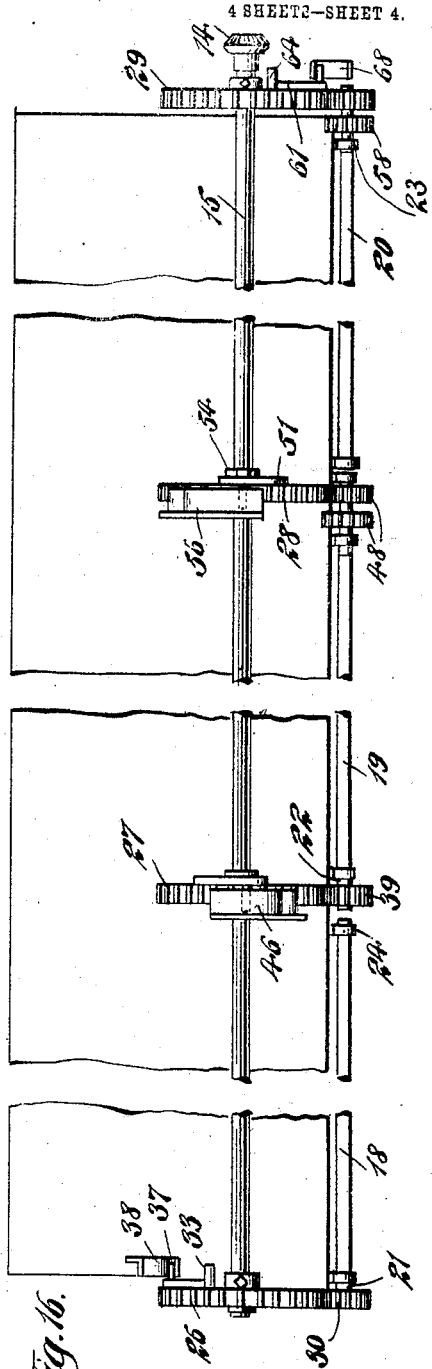

UNITED STATES PATENT OFFICE.

JOHN A. McVICKAR, OF NEW YORK, N. Y.

VEHICLE-SIGNAL.

935,855.  Specification of Letters Patent. Patented Oct. 5, 1909.

Application filed January 15, 1908. Serial No. 410,886.

*To all whom it may concern:*

Be it known that I, JOHN A. McVICKAR, a citizen of the United States of America, and a resident of the city, county, and State of New York, have invented certain new and useful Improvements in Vehicle-Signals, of which the following is a specification.

My improvements relate to visual signaling devices for automobiles and other vehicles, the object being to provide simple and efficient means whereby the driver of an automobile, or the person in front operating the same, or the driver of any other kind of a carriage or vehicle, may display at the rear of the same a signal to vehicles coming behind, which will give a warning that the vehicle in front intends to slacken speed, or stop, or make a turn to the right or to the left, or otherwise regulate or change its movements, which change if unknown to the vehicle behind might in consequence of a too sudden stoppage or deflection of course result in collision between the vehicle in front and the one behind.

It often happens where swiftly moving vehicles like automobiles and slow moving vehicles like trucks occupy the same roadway, that they are thrown into contact with each other on account of one of them stopping more suddenly than it is possible for the other to do; and a similar accident may occur between any two vehicles, one of which is in front of the other, if the one in front makes its movements in utter disregard of the one behind.

My invention aims primarily to enable a more swiftly moving vehicle to present warning signals at the rear, so that the vehicle or vehicles behind can change its or their course, or stop, or otherwise regulate their movements, so that neither vehicle will be damaged.

Nowadays it is common for the driver of the automobile when he intends to slacken speed, or stop, to raise his hand as an indication to vehicles behind of what he is going to do, but this method is often ineffective. By providing signaling mechanism on the rear of the car, absolutely under the control of the driver at all times, said mechanism being so arranged and operated that it cannot fail to call the attention of the drivers of other vehicles, a sure and effective way is provided of notifying the other vehicles to be on their guard and to act accordingly.

While the invention is primarily adapted for automobiles, it may, as suggested, be used with any kind of a vehicle.

The invention therefore consists essentially in a signal of the class described, and in various details and peculiarities thereof, as to combination, arrangement and application, substantially as will be hereinafter more fully described and claimed.

In the accompanying drawing illustrating my invention: Figure 1 is a side elevation of an automobile provided with my improved signaling device. Fig. 2 is a rear elevation of the same. Fig. 3 is an enlarged front elevation of the signaling mechanism. Fig. 4 is a detail view of the controlling lever. Fig. 5 is a cross section on the line $e\ e$ of Fig. 15. Fig. 6 is a cross section on the line $g\ g$ of Fig. 15. Fig. 7 is a cross section on the line $f\ f$ of Fig. 15. Fig. 8 is a detail view of the catch device for holding one of the covers in its raised position. Fig. 9 is a cross section on the line $a\ a$ of Fig. 15. Fig. 10 is a cross section on the line $b\ b$ of Fig. 15. Fig. 11 is a cross section on the line $c\ c$ of Fig. 15. Fig. 12 is a cross section on the line $d\ d$ of Fig. 15. Fig. 13 is a detail elevation of the gearing and accompanying parts shown in Fig. 9. Fig. 14 is a detail elevation of the gearing and accompanying parts shown in Fig. 10. Fig. 15 is an inside elevation of the box containing the operating mechanism, and shows the latter in detail, said box being broken at certain points. Fig. 16 is a top plan view showing the details of the mechanism represented in Fig. 15.

Similar characters of reference designate corresponding parts throughout all the different figures of the drawing.

1 denotes an automobile or horseless carriage of any convenient and suitable type, that shown in the drawing being simply given by way of illustration as one example or specimen of vehicle, because my invention is equally well adapted for use with any kind of automobile, or, in fact, with any of the various kinds or styles of cars, vehicles, carriages, etc., and hence I am by no means restricted to the example illustrated as regards type or motive power. In the forward end of the car 1 is the customary steering device, as, for instance, a wheel 2 on the steering column 3. I arrange in convenient proximity to the steering column a lever 4, (see Fig. 4), which works over the face of a semicircular dial 5 on which are graduations or other marks to indicate the proper positions which the lever 4 must assume for bringing about the proper results. Lever 4 is rigidly fastened to the upper end of a rod 6 which operates, through beveled gears 7 another rod 8 that connects by means of a universal joint 9 with a horizontal rod 10, running to the rear end of the machine, as shown in Fig. 1. Rod 10 transmits motion through the bevel gearing 11 to an upright rod 12, which in turn transmits motion through the bevel gears 13 and 14 to the shaft 15, (see Figs. 3, 13, 15 and 16) which may be termed the main shaft of the signaling mechanism, inasmuch as it is arranged horizontally across the back of the car in connection with the frame of the signaling mechanism, and serves to actuate the various sets of gears which operate independently the different signs, shutters, etc., making up the visual indicators which constitute a part of the signal. These various rods 6, 8, 10 and 12 are suitably supported in appropriate bearings, so that they may turn easily and accomplish the result aimed at.

The main frame of the signaling mechanism is an oblong, horizontal box 16, the exact shape of which is unimportant and may vary widely, its chief function being to contain the working parts of the signal, especially the gears, visual signs, etc., and enable the same to be effectively operated. This frame 16 is supported in a horizontal position on the rear of the car or vehicle 1 at a proper height from the ground, say, about half way the height of the vehicle, as indicated in Fig. 2, it being only important that it should be so arranged that it will be distinctly visible to those in the rear of the automobile. Hence it should not be too low, but is preferably well above the wheels and lower gearing, so that its appearance may be sufficiently prominent to attract attention.

The box 16, as shown in cross section in Figs. 9, 10, 11 and 12, has a glass front 17. This is preferably ground glass or some other translucent material, and the front is divided into several sections, say three, on which are painted, printed, engraved, or otherwise marked, certain words or symbols. An example of these is shown in Fig. 3, where the glass front 17 carries near the middle the word "Caution". At the left of this is the word "Left" and at the right the word "Right". All these words are shown in heavy prominent capitals, so that they may be distinctly seen by any one glancing at the rear of the car when they are exposed to sight. Covering these words severally is a series of shutters 18, 19 and 20; shutter 18 being pivotally hung on the front of the box 16 and adapted to swing down and cover at times the word "Left"; shutter 19 being similarly pivoted on the front of the box 16 and adapted to swing down and cover at times the word "Caution"; and shutter 20 being similarly pivoted on the front of the box 16 and adapted to swing down and cover the word "Right". The mode of pivoting or hinging these shutters on the front of the box 16 may vary widely, and I do not wish to be restricted to any particular way, but commonly lugs or projections on the front of the box 16 will serve as bearings for rods or journals 21 belonging to shutter 18, for journals 22 belonging to shutter 19, and for journals 23 belonging to shutter 20, said lugs or projections being indicated at 24 in Fig. 15. The "caution" signal is intended to be displayed whenever it is desired to indicate to vehicles in the rear that the automobile is about to stop, or to diminish its speed, or otherwise to change the way in which it may have been moving. Then, if the driver decides that he will swerve to the left, he will display the "left" signal; or, if to the right, he will show the "right" signal. These words are severally exposed by the individual lifting of the shutters, which latter is accomplished through the medium of the leverage running to the front of the car, and also through various trains of gearing which are soon to be described. Of course, the word "Caution" is only one of many words which may be employed having a warning signification, and other words can be substituted in lieu thereof. When the machine is running normally, and there is no desire to make any announcement with respect to a change of action, all the signs will be covered by their respective shutters, 18, 19 and 20. Within the box behind the signs are arranged a number of incandescent lamps, or other lighting means 25, which serve to illuminate the signs at night and cause them to produce the same signaling effect as they are able to do in the day time without the lights.

The shutters 18, 19 and 20 are actuated by means of the main signal shaft 15, and four sets of gearing interposed between it and said shutters, as I shall now describe. Shaft 15 may, by means of the lever 4 and the intermediate connections, be turned in one direction or in the other. When it is turned in one direction, it will actuate the "caution" shutter, and also if desired the "left" shutter; when it is turned in the other direction, it will actuate the "caution" shutter, and if desired the "right" shutter. The parts are so arranged, therefore, that by turning it for a certain distance in either direction, the "caution" shutter will be opened, and if the turning is continued either the "left" shutter or the "right" shutter will be opened according to the direction the rotation of the shaft 15 is made to take. Thus, it commonly happens that it is desired merely to expose the "caution" signal without uncovering either of the others, as would be the case if it were simply desired to warn those to the rear of the automobile to be on their guard against a change of speed, etc., and hence it is found very desirable to arrange the mechanism to allow of the opening of the middle shutter without interfering with either of the others. The middle shutter will always be opened prior to the opening of either of the others, and will be held open always while one of the others continues open. Or, in other word, neither the "left" shutter nor the "right" shutter will be opened until after the "caution" shutter has first been opened.

Referring to Fig. 4, when the controlling lever 4 is in the central position O, all three shutters will be closed; when it is reversed to either of the intermediate positions marked C the "caution" signal will be exposed; and when it is placed in the extreme positions marked R and L, the signals "right" or "left" will be exposed respectively. Of course the dial or sector 5 may have any preferred graduations or markings.

Referring to Figs. 9, 10, 11 and 12, and also to Figs. 15 and 16, it will be noticed that Fig. 9 is a cross section on the line $a\ a$ of Fig. 15, and illustrates the gearing whereby the main shaft 15 acts on the "right" shutter 20. Fig. 10 is a cross section on the line $b\ b$ of Fig. 15, and illustrates the gearing by means of which the shaft 15 acts upon the "caution" shutter 19 to lift the same previous to the opening of the "right" shutter. Fig. 11 is a cross section on the line $c\ c$ of Fig. 15, and illustrates the gearing between the shaft 15 and the "caution" shutter 19 at the other end of said shutter opposite where the gearing shown in Fig. 10 is located, and by means of this gearing the "caution" shutter is lifted previous to the opening of the "left" shutter 18. Fig. 12 is a cross section on the line $d\ d$ of Fig. 15, and illustrates the gearing by means of which the shaft 15 is caused to act upon the "left" shutter 18 for the purpose of lifting the same. Thus it will be seen that the gear set in Fig. 9 and that in Fig. 10 come into play when the shaft 15 is turned in one direction and have the function of lifting the "caution" shutter and afterward the "right" shutter; while the gear sets, shown in Figs. 11 and 12, have to do with the "caution" shutter and the "left" shutter, when the shaft 15 is turned in the opposite direction, the result of which is to lift the "caution" shutter, and if the turning of the shaft 15 is continued to lift the "left" shutter also.

On the shaft 15 are loosely mounted four gear wheels, one belonging to each of the gear sets above referred to. Said wheels are designated 26, 27, 28 and 29. Gear wheel 26 engages and actuates pinion 30 which is on one of the journal pins or shafts 21 of "left" shutter 18, so that the revolution of gear wheel 26 in the direction shown by the arrow in Fig. 12 will rotate the pinion 30 in a reverse direction; that is to say, in the direction shown by the arrow near said pinion 30, the result of which will be to lift the shutter 18 upward, off the signal "left", into the elevated position shown in Fig. 3. On the shaft 15, alongside of the gear wheel 26, is a rigid arm 31, the same being secured to the shaft in any suitable way, as, for instance, by its having a sleeve which surrounds the shaft, and is locked thereto by means of a set screw 32. On the face of the gear wheel 26 is a pin 33 projecting therefrom into position to be struck by the shaft arm 31. Furthermore, a latch 34 is pivoted at 35 to the face of the gear wheel 26, said latch having a lug 36 which is adapted at certain times to lie in the path of the arm 31, and said latch having also a pin 37 which works on an irregular track 38. When the shaft 15 and the arm 31 move in a direction opposite to the arrow, said arm exerts no effect upon the gear set; but when the shaft 15 moves it in the opposite direction so that the arm 31 strikes against the lateral pin 33, the gear wheel 26 will be revolved in the direction shown by the arrow, and the pinion 30 correspondingly rotated, and the shutter 18 lifted. The arm 31 may be moved one-eighth (for example) of a revolution of the shaft 15 before it strikes the pin 33, and as said eighth of a revolution is sufficient to lift the "caution" shutter 19, as will be presently explained, there will be no action imparted by the arm 31 to the gear wheels 26 and 30 by striking pin 33 until after the "caution" shutter 19 has first been lifted. Further, when the arm 31 strikes the pin 33 it will clear the lug 36 of the latch 34, because the pin 37 of said latch will be in the socketed end of the track 38 which is farthest from the center of the shaft 15; but if the gear 26 be rotated, carrying with it the latch 34, the pin 37 of said latch will soon ride upon a portion of the track 38, which is concentric with the shaft 15, or situated in an arc substantially concentric with the gear wheel 26, the effect of which is to throw the lug 36 nearer to the center of the gear wheel 26, so that it will be in the path of the returning arm 31, and when the latter is reversed in its movement and caused to travel away from the pin 33, it will in consequence of contact with the lug 36 reverse the rotation of the gear wheel 26, thereby closing the shutter 18, and this action of the arm 31 upon the latch lug 36 will continue long enough to make the closure of the shutter 18 complete, at which time the latch having been again drawn away from the arm 31, in consequence of the pin 37 dropping into the lower end of the track 38, the arm 31 will be able to clear the lug 36.

The gear wheel 27 is loose on the shaft 15 at a point near the left-hand end of the "caution" shutter 19, and it engages with a pinion 39 on the journal 22 of said shutter, so that when the gear wheel 27 is revolved in the direction of the arrow in Fig. 11, it will rotate the pinion 39 in the reverse direction and lift the shutter 19. On the shaft 15 alongside of the gear wheel 27 are two arms 40 and 41 forming parts of a single casting having a sleeve which surrounds the shaft 15 and is securely fastened thereto by means of a set screw 42. Pivoted to the face of the gear wheel 27 are two latch devices 43, 43, each having a lug 44 and each having a pin 45 engaging a track 46, the two tracks 46 being similar to the track 38 in conjunction with which we have seen that the gear latch 34 operates.

When the shaft 15 rotates in a direction the reverse of the arrow, (shown in Fig. 11 alongside of gear wheel 27), it will produce no effect upon the gear wheel 27, because at that time one of the latches 43 will have its lug 44 clear of the adjacent arm 41, while the other latch 43, though in engagement with the arm 40, will not be acted upon thereby until the revolution of the shaft 15 moves the arm 40 in the direction of the arrow and thus actuates the latch 43 and the gear wheel to which it is pivoted. But if the shaft 15 is rotated in the direction of the arrow it will be obvious that the gear wheel 27 will be simultaneously rotated, and such rotation of the gear wheel 27 will continue until the upper latch 43, by throwing its pin 45 into the socket of the adjacent track 46, causes the lug 44 to be thrown clear of the end of the arm 40. At the time that this latter condition occurs, however, the opposite latch 43 will have worked along the adjacent track 46 into such a position that the lug 44 will be thrown across the path of the end of the arm 41, so that when the shaft 15 revolves in the reverse direction to that in which it formerly moved it will act against this lower latch 43 and rotate the gear wheel 27 reversely to its arrow, thereby again closing the shutter 19.

Observing now Figs. 11 and 12 at the same time, and remembering that the gear set in Fig. 11 is applied to the "caution" shutter 19 at one end thereof, and that the gear set in Fig 12 is applied to the "left" shutter 18, it will be seen that the movement of the shaft 15 in the direction of the arrow near the large gears 26 and 27 in both figures will cause a movement of gear wheel 27 sufficient to open the shutter 19, but will not cause any movement of gear wheel 26, which opens shutter 18, until after said shaft has been rotated throughout one-eighth of a revolution; or, in other words, until after the arm 31 in Fig. 12 has engaged the projecting pin 33 of the gear 26. Thus a rotation of the shaft 15 in one direction, due to a shifting of the lever 4 toward the left, say, will, if the lever 4 is stopped at the point C, which will be at one-eighth of a revolution of the shaft 15, merely open the "caution" shutter and will not open the "left" shutter 18. If that is to be opened, the movement of the lever 4 must be continued further to the left, so that the wheel 26 can be revolved. If, after opening the shutter 19, the lever 4 be moved back to its central position, the shutter 19 will be closed down over the word "caution", for the arm 41 in Fig. 11 will engage the lower latch 43 and bring the gear wheel 27 around to its first position. In case at the beginning the shaft 15 instead of being revolved in the direction of the large arrows in Figs. 11 and 12 be rotated in a reverse direction, no effect will be produced through either of these two sets of gears upon the shutters 18 and 19. Such a reverse revolution of the shaft 15 will through another set of gears, however, open the "caution" shutter, as I shall now specify, and under certain conditions both the "caution" and the "right" shutters. The other set of gears, through whose intervention the "caution" shutter is opened when the shaft 15 revolves in a reverse direction, is indicated in Fig. 10. The arrangement is similar to that in Fig. 11, although the parts are reversely placed. In this case the gear set is arranged between the main shaft 15 and the right-hand end of the shutter 19. The gear wheel 28, which is loose on the shaft 15, engages the pinion 47 on a short shaft 48 suitably supported in proper bearings. On the same shaft 48, which carries the pinion 47, is another pinion 50 which engages a pinion 49 on the journal 22 of the shutter 19. The interposition of the shaft 48 and the intermediate pinions 47 and 50 is necessary in order to cause a proper rotation of the shutter pinion 49, for the purpose of lifting the shutter 19, it being remembered that the shaft 15 is now rotating in a direction the reverse of that in which it rotates in Figs. 11 and 12 for effective action.

Pivoted to the face of the gear wheel 28 are two latches 51 similar to the above-described latches 34 and 43. Said latches 51 are provided with lugs 52, adapted at times to lie in the path of the arms 53 and 54 which are rigidly attached to and rotate with the shaft 15. The latches 51 are furthermore provided with pins 55 which work in tracks 56, said tracks 56 being similar in arrangement and function to the above-described tracks 38 and 46. When the shaft 15, carrying the arms 53 and 54, rotates in the direction of the large arrow in Fig. 10, the arm 54 in engagement with the lug 52 on the upper latch 51 will move the same way, and consequently act upon the gear wheel 28, and this movement will continue until the upper latch 51 is switched to one side by the action of its pin 55 in the track 56 sufficiently far to disengage the lug 52 from the end of the arm 54. But at the time this occurs the gear wheel 28 will have moved far enough to cause, through the interaction of the pinions 47, 50 and 49, a lifting of the "caution" shutter 19 into the open position shown in Fig. 3. In consequence of the peculiar arrangement of the latches 51 and their tracks 56, it comes about that when the upper latch 51 is released from the arm 54, the lower latch 51 will have been moved to such a position that its lug 52 will be in the path of the arm 53, so that when the arm 53 moves in a reverse direction it will carry with it the lower latch 51 and the gear wheel 28 in a direction the reverse of the large arrow to its first position. If, however, after opening the shutter 19 the movement of the shaft 15 should be continued to a certain extent in the same direction, the effect will be to open the "right" shutter 20 through the interaction of the gear set shown in Figs. 9 and 13. In case at the beginning the shaft 15 should be moved in a direction opposite to the large arrow, it would not have any effect on the gear set shown in Fig. 10, nor that shown in Fig. 9, for the effect in that case would be upon the gear sets illustrated in Figs. 11 and 12, as I have already fully explained.

Referring now to Fig. 9, which represents the gear set on the line $a$ $a$ of Fig. 15, and is the set of gears connecting the shaft 15 with the journal or shaft 23 of the shutter 20, it will be seen that the gear wheel 29 engages a pinion 57 on a short shaft 58 suitably supported in the main frame, which shaft 58 also carries another pinion 59 that engages a pinion 60 on the journal or shaft 23 of the shutter 20. Hence, when the gear wheel 29 revolves in the direction shown by the arrow, the pinion 60 will revolve in the direction shown by its arrow, which will result in lifting the shutter 20 and exposing the word "Right". Pivoted to the side of the gear wheel 29 is a latch 61, the pivot being denoted by the reference numeral 62. Latch 61 has a lug 63 thereon. On the side of the gear 29 projects horizontally a pin 64 adapted to be engaged by an arm 65 provided with an integral sleeve which surrounds the main shaft 15 and is clamped thereto by means of a set screw 66 The latch 61 also has a pin 67 that operates in conjunction with a track 68. The arrangement of the latch 61 is the reverse of the latch 34 in Fig. 12. Obviously the arm 65 may travel for a certain distance toward the pin 64 without moving the gear 29 or exerting any effect on the shutter 20, for during such movement the operation is taking place through the gearing shown in Fig. 10, whereby the "caution" shutter 19 is lifted. After the arm 65 strikes the pin 64, however, the gear wheel 29 will be rotated in the direction shown by the arrow, the latch 61 at this time, in consequence of the action of the pin 67 along the track 68 not affording any obstacle to the movement of said arm 65. When, however, the revolution of the gear wheel 29 is continued far enough to cause the pin 67 of the latch 61 to travel on the concentric portion of the track 68, the lug 63 will be thrown in beyond the end of the arm 65, so that when the latter begins a return movement it will strike against the said lug 63 and carry the gear wheel 29 back into the position shown in Fig. 9. Thus it will be seen that the operation of the gear set of Fig. 9 is substantially the same as that of the gear set in Fig. 12, except that it is in the reverse direction, and the intermediate pinion 57 is interposed in order to allow the proper revolution to be imparted to the shutter journal or shaft which will lift the shutter.

Referring to the feature of the latches which are pivoted to the gears 26, 27, 28 and 29, namely the latch 34 which is pivoted to the gear wheel 26, the latches 43, 43, which are pivoted to the gear wheel 27, the latches 51, 51, which are pivoted to the gear wheel 28, and the latch 61 which is pivoted to the gear wheel 29, it will be observed that they are all pivoted loosely to the side of the respective gear wheels near their cogged periphery, and hence are all pendent from their pivotal points on the gear wheels. But this pendency is not entirely free and does not permit the latches to assume each its position at all times through the action of gravity alone, for each latch is provided with a projecting horizontal pin already mentioned, (viz: the pins designated 37, 55, 45 and 67), which works on the adjoining track, said tracks being designated 38, 46, 56, and 68. These tracks consist of curved parts which are preferably concentric with the respective gear wheels and with the main shaft 15, but at one end of each track there is a bend furnishing a socket into which the horizontal pin drops during certain points of the rotation of the respective gear wheels, and when these sockets receive said pins the latches are drawn back so that their projecting lugs are removed farther from the axis of rotation of the gear wheels. This is so because the socket at the ends of the track are farther from the axis of rotation of the gears than is the balance of each track, and hence the action on the projecting lug of each latch is different when the position of the latch is controlled by the curved portion of the track than when the position is controlled by the socket portion. The object of having the socket portions is simply to withdraw the latches so that they will not be in position to be caught by the rotating arms, all as hereinabove fully explained.

If desired, the "caution" shutter 19 may be retained for the time being in its lifted position by means of some suitable catch device. An example of such device is indicated in Fig. 8 where the shutter is shown as provided with a finger 75 adapted to engage a spring socket 76, said socket being on the main frame 16. It may be found in practice that such a device can be handily used, though I am not restricted thereto. When it is used, the shutter 19 will be kept lifted until the finger and spring socket are disengaged from each other.

In order to supply the necessary electric current for the lamps 25, I place on the main shaft 15 at certain intervals contact arms 69, 70 and 71, shown in Figs. 5, 6 and 7, and also in Fig. 15. The arm 69 contacts with the plate 72 when the shaft 15 is rotated in such a direction that the gear set indicated in Fig. 9 acts upon the shutter 20 for the purpose of lifting the same, so that when said shutter 20 is lifted the lamps behind the "right" signal may illuminate said signal. Of course, the contact between the arm 69 and the plate 72 closes the electric circuit and lights the lamps 25 behind that portion of the glass front 17 on which the word "Right" appears. The plate 72 is connected to a storage battery or other source of electricity situated in some part of the car or vehicle. The arm 71, seen in Fig. 6, is adapted to contact with the plate 73 when the shaft 15 moves in a direction opposite to that in which it moves in Fig. 5, and when such contact is established between the arm 71 and the plate 73 the circuit will be closed and the lamps will be lighted behind that portion of the translucent front 17 on which the word "Left" is inscribed. Hence the arm 71 contacts with the plate 73 when the shaft 15 moves in the proper direction to actuate the gearing shown in the sectional view of Fig. 12 on the line d d of Fig. 15, whereby the shutter 18 is lifted for the purpose of exposing the "left" signal, and thus simultaneously with the lifting of the shutter 18 the lamps are lighted behind the "left" signal and the latter illuminated so that it can be easily seen at night. The arm 70, seen in Fig. 7, contacts either with the plate 74 or the plate 77, accordingly as the shaft 15 is rotated in one direction or in the other. When it is rotated in one direction, the gearing illustrated in Fig. 10 is brought into action for the purpose of lifting the "caution" shutter; and when it is actuated in the other direction, the gearing illustrated in Fig. 11 is brought into action for the purpose of operating the "caution" shutter; but whichever may be the direction in which the shaft 15 is rotated it will in the one case be brought into contact with the plate 74, and in the other case with the plate 77, the result of either of which contacts will be to close the electric circuit and light the lamps behind that translucent portion of the glass front 17 on which the word "Caution" is inscribed, so that in either case simultaneously with the lifting of the shutter 19 the lamps are lighted behind the word "caution", so that the same may show clearly and brightly in the dark.

Many changes in the precise combination and arrangement of the various details may be made without departing from my invention, and I reserve the liberty of modifying the embodiment as far as may be found necessary and practicable in order to accomplish the best results, provided I do not go beyond the scope of the claims.

The invention is much broader than any of the mechanical details herein illustrated, and it is obvious that the working of the several signals from the front of the car or vehicle may be accomplished through the intervention of divers kinds of mechanism, varying widely from the details herein set forth, in so far as such variation may be permissible under the appended claims.

Having thus described my invention, what I claim as new and desire to secure by Letters Patent, is:

1. In a signal for vehicles, the combination of a caution signal, a signal separate from the caution signal for indicating direction, separate mechanisms for displaying the said signals respectively and connecting means operatively joining the said mechanisms, these parts being so arranged that the caution signal must be displayed before the direction signal can be displayed, and means controlled and operated at the will of the occupant of the vehicle for operating the said connecting means.

2. In a signal for vehicles, the combination of a caution signal, a signal separate from the caution signal for indicating direction, means for controlling the display of the said signals, and means for operating the said controlling means, consisting of a single line of power transmitting devices arranged to be operated by the driver of the vehicle and when moved through a certain angle to cause the display of the caution signal and when moved through a greater angle to cause the direction-indicating signal to be displayed.

3. In a signal for vehicles, the combination of a signal consisting of a plurality of symbols, one signifying caution and the others signifying respectively, a movement in one direction and a movement in the other direction, individual devices for controlling the exposure of the said symbols, and means for operating the exposure-controlling devices arranged to display the caution symbol whenever either one of the others is exposed.

4. In a signal for vehicles, the combination of a signal consisting of a plurality of symbols, one signifying caution, and two others at each side of the latter signifying respectively a movement in different directions; individual shutters for covering or exposing said signals, and means for operating said shutters, arranged to display the symbol indicating caution whenever either one of the other symbols is exposed.

5. In a signal for vehicles, the combination of a caution signal, a signal indicating movement in one direction, a signal indicating movement in another direction, individual devices for controlling the display of the said signals, and means for operating said display-controlling devices arranged when moved a certain distance to display the signal indicating caution and when moved a greater distance to display one of the other signals without disturbing the caution signal.

6. In a signal for vehicles, the combination of a caution signal, a signal indicating movement in one direction, a signal indicating movement in another direction, individual devices for controlling the display of the said signals, and means for operating the said display-controlling devices comprising a single line of power transmitting connections arranged to be operated by the driver of the vehicle, and having a controlling member arranged when moved a certain distance in either direction from a mid-position to cause the display of the caution signal and when moved a farther distance to cause a display of a direction-indicating signal.

7. In a signal for vehicles, the combination with a plurality of symbols, of shutters adapted to conceal or expose the same, and means for operating the shutters consisting essentially of a main shaft, two sets of gears for applying the motion of the shaft to one of the shutters and a set of gears for applying the motion of the shaft to each of the other shutters, all arranged so that when the shaft is rotated in one direction one or more of the shutters may be opened according to the extent to which the shaft is rotated and when rotated in the opposite direction one or more of the shutters may be opened according to the extent to which the shaft is rotated in that direction, substantially as described.

8. In a signal for vehicles, the combination with a plurality of symbols, one of which signifies caution generally, another at one side of the latter signifies a movement in one direction, and another at another side signifies a movement in another direction, of shutters adapted to conceal or expose said symbols, and means for operating the shutters, said means consisting essentially of a main shaft, suitable sets of gearing between it and the respective shutters, and means for actuating the main shaft from the front of the vehicle.

9. In a signal for vehicles, the combination with a plurality of symbols, one signifying generally caution, and two others, one at each side of the latter signifying respectively a movement in different directions, of a shutter for each symbol, and means for operating the shutters consisting essentially of mechanism whose operation is always to first open the middle shutter which belongs to the symbol signifying caution generally and which if desired may be caused to open one of the other shutters.

10. In a signal for vehicles, the combination with a plurality of symbols, one signifying caution generally and the others signifying a movement to the left or right, of individual shutters for the symbols, and means for operating the shutters including a main shaft and sets of gearing between it and the shutters respectively, all arranged and operating so that the cautionary symbol must invariably be first displayed when the shaft is turned while a continuation of the operation of the mechanism after first displaying the cautionary signal will result in displaying the right or the left signal accordingly as the main shaft is being turned in one direction or the other.

11. In a signal for vehicles, the combination with a plurality of symbols, one signifying caution and two others signifying respectively a movement to the right or to the left, of shutters adapted to conceal or expose the symbols, and means for operating the shutters consisting essentially of a main shaft, means for rotating it in one direction or the other, gears loose on the shaft, sets of intermediate gears between the loose gears and the respective shutters, and means whereby the rotation of the shaft in either direction is properly applied to the loose gears.

12. In a signal for vehicles, the combination with a plurality of symbols, of shutters adapted to conceal or expose the same, and means for operating the shutters consisting essentially of a main shaft, a series of loose gears thereon one for each shutter, sets of intermediate gearing between said loose gears and the shutters, and means whereby the movement of the shaft is applied to one of the loose gears when it is rotated in one direction and to another of the loose gears when it is rotated in the opposite direction, said means consisting essentially of pivoted latch devices, and means whereby the movement of the shaft is imparted to a second set of the loose gears if the movement in either direction is continued long enough.

13. In a signal for vehicles, the combination with a plurality of symbols, of shutters adapted to conceal or expose the same, and means for operating the shutters consisting essentially of a main shaft, a series of loose gears thereon, one for each shutter, intermediate gearing between the loose gears and the respective shutters, latch devices on the gears whereby the motion of the main shaft is communicated thereto, in either direction, to allow of the opening and closing of the shutters individually as the result of the rotation of the main shaft.

14. In a signal for vehicles, the combination with a plurality of symbols, of shutters adapted to conceal or expose the same, and means for lifting or closing the shutters, said means consisting essentially of a main shaft, a series of gears loose thereon, intermediate gearing between said loose gears and the shutters, there being two sets of gearing for the middle shutter which carries a cautionary symbol, and one set of gearing for each of the other shutters, all combined and arranged so that the shutter covering the cautionary symbol will be always actuated first whichever way the main shaft be turned, and one of the other shutters will be actuated later if desired if the shaft be turned to the point that causes a display of the cover symbol.

15. In a signal for vehicles, the combination with a plurality of symbols, of shutters adapted to conceal or expose the same, and means for operating the shutters consisting essentially of a main shaft, gears for applying the motion of the main shaft to the shutters for the purpose of opening and closing the same, electric connections whereby the symbols may be illuminated simultaneously with the opening of the respective shutters, all combined and arranged substantially as described.

16. In a signal for vehicles, the combination of a symbol indicating caution, a symbol indicating direction, independent means for controlling the display of the said symbols, and means for operating the said independent controlling means arranged to display the caution symbol whenever the symbol that indicates direction is displayed.

Signed at New York city, this 30th day of December, 1907.

JOHN A. McVICKAR.

Witnesses:
RICHARD CONDON,
C. B. SCHROEDER.